(12) United States Patent
Hecht et al.

(10) Patent No.: US 11,086,119 B2
(45) Date of Patent: Aug. 10, 2021

(54) FLUORESCENCE-LIFETIME IMAGING MICROSCOPY METHOD HAVING TIME-CORRELATED SINGLE-PHOTON COUNTING

(71) Applicant: LEICA MICROSYSTEMS CMS GMBH, Wetzlar (DE)

(72) Inventors: Frank Hecht, Mannheim (DE); Bernd Widzgowski, Dossenheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 16/969,645

(22) PCT Filed: Dec. 18, 2018

(86) PCT No.: PCT/EP2018/085379
§ 371 (c)(1),
(2) Date: Aug. 13, 2020

(87) PCT Pub. No.: WO2019/158260
PCT Pub. Date: Aug. 22, 2019

(65) Prior Publication Data
US 2020/0400933 A1 Dec. 24, 2020

(30) Foreign Application Priority Data
Feb. 16, 2018 (DE) .................. 10 2018 103 576.4

(51) Int. Cl.
*G02B 21/06* (2006.01)
*G02B 21/36* (2006.01)
(Continued)

(52) U.S. Cl.
CPC ....... *G02B 21/365* (2013.01); *G01N 21/6408* (2013.01); *G02B 21/06* (2013.01); *G02B 21/16* (2013.01); *G01N 2201/126* (2013.01)

(58) Field of Classification Search
CPC .......... G01N 21/6408; G01N 21/6458; G02B 21/16; G02B 21/367
See application file for complete search history.

(56) References Cited

U.S. PATENT DOCUMENTS

2011/0180726 A1* 7/2011 Gratton .............. G01N 21/6458
250/459.1
2019/0339201 A1 11/2019 Seyfried et al.

FOREIGN PATENT DOCUMENTS

WO WO 2010/089363 A1 8/2010
WO WO 2017/202980 A1 11/2017

OTHER PUBLICATIONS

Patting, Matthias et al. "Dead-time effects in TCSPC data analysis," Proceedings of SPIE, vol. 6583, May 4, 2007, pp. 658307-1, XP055413435.
(Continued)

*Primary Examiner* — David P Porta
*Assistant Examiner* — Frani Boosalis
(74) *Attorney, Agent, or Firm* — Leydig, Voit & Mayer Ltd.

(57) ABSTRACT

A fluorescence-lifetime imaging microscopy method with time-correlated single-photon counting includes using excitation light pulses separated in each case by a measurement interval to excite a sample to emit fluorescence photons. A detector signal that represents the captured fluorescence photons is generated. Detection times are determined based on the detector signal. Imaging is performed based on the detection times. The detection times of all captured fluorescence photons are compiled in a first data memory, common to a plurality of image pixels. The detection times of only those fluorescence photons which were captured in a predetermined number within the respective measurement intervals are compiled in a second data memory, common to the same plurality of image pixels. The detection times
(Continued)

compiled in the data memories are combined within a calculation step. The results of the calculation step are stored in a third data memory.

15 Claims, 5 Drawing Sheets

(51) Int. Cl.
*G01N 21/64* (2006.01)
*G02B 21/16* (2006.01)

(56) References Cited

OTHER PUBLICATIONS

Chang, Ching-Wei et al. „Fluorescence Lifetime Imaging Microscopy" In: „Recent Advances in Cytometry, Part A—Instrumentation, Methods", Jan. 1, 2007, Elsevier, XP055217096.
Coates, P. B., "Pile-up corrections in the measurement of lifetimes," J. Phys. E: Sci. Instrum. 5, 148-150, Feb. 1972.
Walker, John G., "Iterative correction for 'pile-up' in single-photon lifetime measurement," Opt. Comm., 201, 271-277, Jan. 15, 2002.
Patting, Matthias et al., "Fluorescence decay data analysis correcting for detector pulse pile-up at very high count rates," Optical Engineering, 57(3), 031305, Mar. 2018.
Driscoll, Jonathan D. et al., "Photon counting, censor corrections, and lifetime imaging for improved detection in two-photon microscopy," J Neurophysiol 105: 3106-3113, Apr. 6, 2011.
Marquardt, Donald W., "An algorithm for Least-Squares Estimation of Nonlinear Parameters," J. Soc. Indust. Appl. Math., 11(2) 431-441, Jun. 1963.

\* cited by examiner

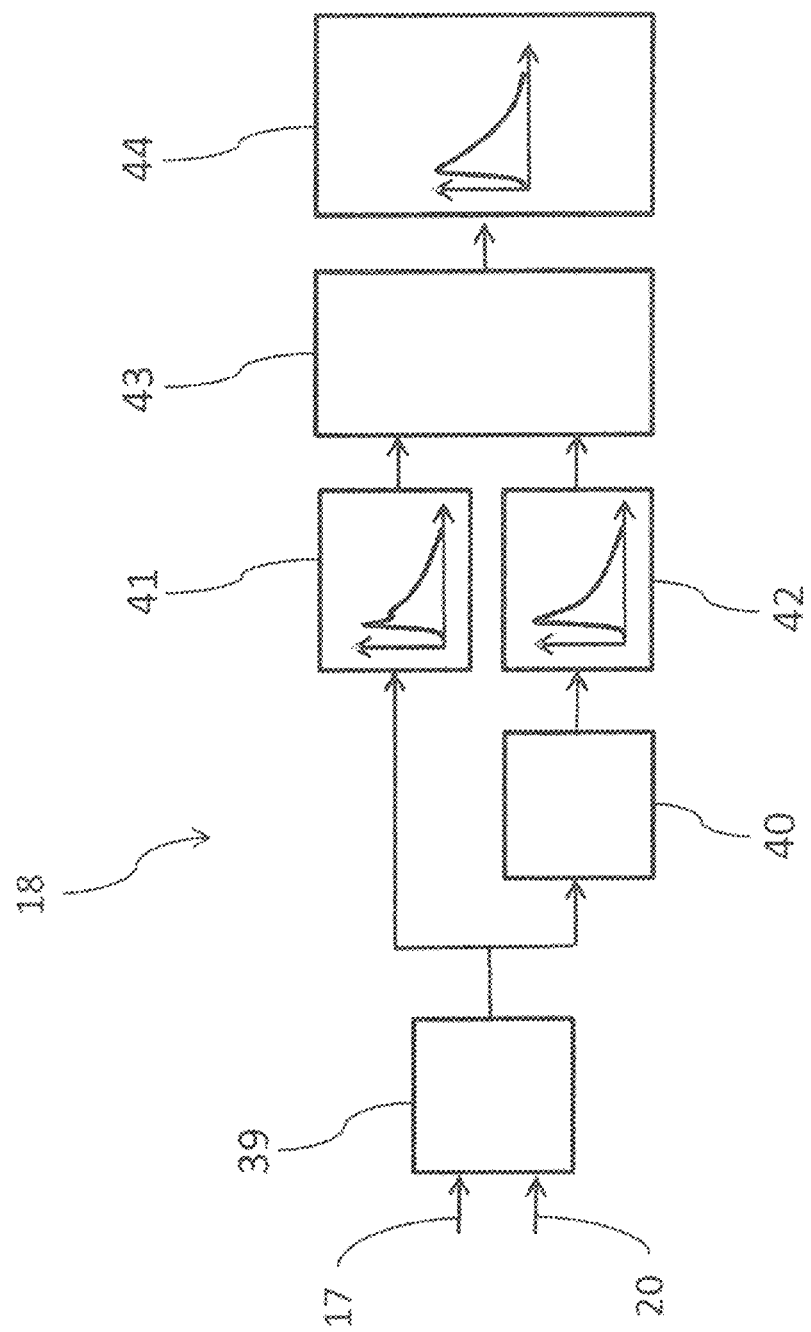

FLUORESCENCE-LIFETIME IMAGING MICROSCOPY METHOD HAVING TIME-CORRELATED SINGLE-PHOTON COUNTING

CROSS-REFERENCE TO PRIOR APPLICATIONS

This application is a U.S. National Phase application under 35 U.S.C. § 371 of International Application No. PCT/EP2018/085379, filed on Dec. 18, 2018, and claims benefit to German Patent Application No. DE 10 2018 103 576.4, filed on Feb. 16, 2018. The International Application was published in German on Aug. 22, 2019, as WO 2019/158260 under PCT Article 21(2).

FIELD

The invention relates to a fluorescence-lifetime imaging microscopy method for the numerical correction of data in time-correlated single photon counting and a microscope for carrying out such a method.

BACKGROUND

Fluorescence-lifetime imaging microscopy, abbreviated FLIM, is an imaging fluorescence-microscopic method based on the measurement of the different lifetimes of excited states of fluorescent molecules. The measured lifetimes allow ambient properties of the fluorescent molecule, such as pH value, temperature, ion concentration, FRET transitions, etc., to be deduced, for example, FRET being an abbreviation for Foerster resonance energy transfer.

The fluorescence lifetime can be determined directly in the time domain ("time domain lifetime measurement") or, in an alternative method, in the frequency domain ("frequency domain lifetime measurement"). A determination in the time domain is possible using the method of so-called time-correlated single photon counting, abbreviated TCSPC. In this method, the photons released by the periodic excitation with the excitation light pulses are captured individually. Typically, the time between an excitation light pulse and the subsequent fluorescence signal captured by the detector is measured. The fluorescence photons captured thus for a multiplicity of measurements are then collected in a histogram. Such a histogram plots the photon number against measured time. Depending on the fluorescence molecules present in the sample, a time-dependent decrease in the fluorescence intensity with one or more exponential components is observed.

In this method, the time measurement is usually implemented with a resolution below one nanosecond. The effects of errors caused by device components such as light source, optical unit, detector and electronics are important when measuring time in this time range. The totality of errors caused by the device is referred to as the instrument response function, abbreviated IRF.

The instrument response function can be measured under optimal recording conditions. Determining the instrument response function from the data of the recording of the sample to be examined itself is also common.

The recorded data are usually analyzed with a nonlinear optimization method using a model function of the form $$f(t) = \int_0^t IRF(x) \cdot \left\{ \sum_{n=1}^{N} A_n \cdot e^{\frac{x}{\tau_n}} + B \right\} dx$$

where N is the number of fluorescing components, $A_n$ are the amplitudes of individual components, $\tau_n$ are the lifetimes of the individual components, B is a background, and IRF(t) is the instrument response function. The optimization method allows the lifetimes $\tau_n$ and the associated amplitudes $A_n$ to be determined. The accuracy of the determined lifetimes $\tau_n$ depends strongly on the number of recorded photons. By way of example, several 100 photons are currently required to determine the lifetime $\tau_n$ of one component with a measurement accuracy of 10%. Approximately 10 000 photons are required for two components.

In order to be able to examine samples with a plurality of components within a reasonable time, the histograms of all image pixels or of a region of image pixels are usually compiled to form a histogram, which is referred to here as overall histogram ("overall decay"). The application of the optimization method to an overall histogram provides the lifetimes $\tau_n$ and the amplitudes $A_n$ with a sufficient accuracy. The results are usually then applied to the individual image pixels in a second step under the application of the optimization method, with only selected parameters of the model function, e.g., only the amplitudes $A_n$ or only the lifetime $\tau_n$ of a component, needing to be determined with a sufficient accuracy.

A problem associated with the above-described method based on individual photon counting is that the combination of detector and electronics is not ready to detect a further photon during a certain amount of time directly after the capture of an individual photon. This amount of time is also referred to as the dead time of the system. The influences of the dead time of the system cannot be taken into account in the instrument response function IRF(t) as they depend on the sample itself. While the typical dead time of conventional systems ranges between approximately 50 and 100 ns, technical advances in electronics and detectors have in the meantime also led to systems with a dead time in the region of a few nanoseconds.

In systems with a dead time longer than the period of the excitation light pulses, it is usually only possible to detect the first fluorescence photon following the excitation light pulse. There is a higher weighting of shorter time components in the histogram. This higher weighting, which falsifies the measurement result, is also referred to as pile-up effect in the art. In order to avoid this pile-up effect, the intensity of the incident excitation light pulses must be set to be so low that the correspondingly long recording time leads to a significant restriction in the applicability of this process.

The recorded data are falsified, even in the case of systems with a dead time in the region of a few nanoseconds. A molecule emits substantially more photons directly after the excitation light pulse than at later times. A significant proportion of these photons still strikes the detector within the dead time. Although such systems allow an increase in the intensity of the incident excitation light pulses while having measurement errors comparable to conventional devices, this increase is not sufficient to achieve the recording times of other microscopy methods.

Dead time effects can be significantly reduced by comprehensive parallelization in respect of detector and electronics. However, such parallelization is technically complex and therefore linked to significant costs. Hence, correcting the dead time effects is of essential importance when using the fluorescence lifetime imaging microscopy for a multiplicity of applications.

The literature has disclosed numerous methods for correcting the dead time effects within the scope of time-correlated single photon counting. All have restrictions in respect of their applicability to an overall histogram or restrictions in the choice of usable detector types or electronics. These methods can be divided into three groups: methods which filter signals from the detector, methods which modify histogram data, and methods which make changes during the optimization method itself.

In addition to the aspect of correct data analysis, the data representation vis-à-vis the user is also important. From the graphical display, users can draw conclusions about the results of the recording and further necessary activities. A representation of the overall histogram in corrected form is therefore desirable.

WO 2017/201980 describes a method which only takes account of periods of excitation light pulses in which a predetermined number of photons were captured between successive excitation light pulses. This method can be used to generate a corrected overall histogram if detector and electronics meet a few requirements. The signal width must not differ too much for different photons, a plurality of photon signals in quick succession must be able to be identified and the electronics must comprise an evaluation method in respect of the pulse width which facilitates such filtering. Consequently, this method is not universally applicable.

P. B. Coates, "Pile-up corrections in the measurement of lifetimes," J. Phys. E: Sci. Instrum. 5, 148-150 (1972) describes a method in which each column in the histogram assigned to the respective detection time is modified independently of the other columns. The modification is based on the properties of the statistics of the detection of photons. The method cannot be applied to an overall histogram since an overall histogram is compiled from the data of different sample locations with, accordingly, different intensities. Correction before compiling fails due to an insufficient number of photons in the individual histograms.

J. G. Walker, "Iterative correction for 'pile-up' in single-photon lifetime measurement," Opt. Comm., 201, 271-277 (2002) describes a refined method which additionally takes account of intensity variations in the light source using an iterative approach. Intensity variations are no longer a relevant source of error in currently used pulsed laser light sources. However the concept could also be taken up for taking account of different intensities in the different image pixels which are compiled in the overall histogram. However, this iterative method often does not converge in practice since the intensities may differ too much.

M. Patting et al., "Dead-time effects in TCSPC data analysis," Proc. of SPIE vol. 6583, 658307, (2007) describes a method in which the model function of the optimization method is adapted in order to take account of dead time effects. If the simplification described therein is dispensed with, the method is also applicable to data generated by systems with a very short dead time. In the modified model function $f_m(t)$ $$f_m(t) = f(t) \cdot \prod_{y=t-t_d}^{t} \left\{ 1 - \frac{1}{P} \cdot f(y) \right\}$$

the model function $f(t)$ specified above is multiplied by a correction term which corresponds to the probability of detecting no photon within the dead time. P is the number of excitation light pulses and $t_d$ is the dead time of the system. The method is suitable for determining the sought-after parameters in the individual image pixels using an optimization method. An application to an overall histogram is not possible.

M. Patting et al., "Fluorescence decay data analysis correcting for detector pulse pileup at very high count rates," Optical Engineering, 57(3), 031305 (2018) likewise describes a method in which the model function of the optimization method is adapted. The correction term proposed therein assumes that, in only one histogram column, the correction factor resulting from the Poisson statistics characterizes the influence of the dead time for this histogram column. However, this is not the case, in particular, if the start of the histogram which is assigned to the detection times at the beginning of the measurement interval is dominated by a component with a very short lifetime. As a result of the errors connected therewith, a user has to check whether the method is suitable for the respective application.

WO 2010/089363 A1 describes a method in which changes are made during the optimization method itself, said changes serving to take account of the dead time effect. In the form described therein, the method cannot be applied to an overall histogram. It is not possible to present a corrected overall histogram.

J. D. Driscoll et al., "Photon counting, censor corrections, and lifetime imaging for improved detection in two-photon microscopy," J Neurophysiol 105: 3106-3113, (2011) describes a dead time correction for a system with a 3.1 ns dead time. Two methods with correction of both the histogram and the calculation of the quality criterion of the optimization method are proposed.

In the first of the two aforementioned methods, the number of excitation light pulses for which no photon was detected is additionally determined for each column in the histogram. In the second method, the number of excitation light pulses for which exactly one photon was detected is additionally determined. The additional information is used to ascertain a correction value on the basis of the Poisson statistics. Both methods are subject to the same restrictions as Coates' method. The second method additionally demands that only one component in the sample with a known lifetime dominates the start of the decay behavior in the histogram.

SUMMARY

In an embodiment, the present invention provides a fluorescence-lifetime imaging microscopy method with time-correlated single-photon counting. Excitation light pulses of a pulsed light source are used to periodically excite a sample to emit fluorescence photons, with a measurement interval being defined between two successive excitation light pulses in each case. A detector is used to capture the fluorescence photons, and a detector signal that represents the captured fluorescence photons is generated. Detection times at which the fluorescence photons are detected by the detector within the respective measurement intervals are determined based on the detector signal. Imaging is performed based on the detection times. There is a determination within the respective measurement intervals as to whether a predetermined number of fluorescence photons have been captured within the respective measurement interval. The detection times of all captured fluorescence photons are compiled in a first data memory, common to a plurality of image pixels. The detection times of only those fluorescence photons which were captured in the predetermined number within the respective measurement intervals are compiled in a second data memory, common to the same plurality of image pixels. The detection times compiled in the first data memory are combined with the detection times compiled in the second data memory within a calculation step. The results of the calculation step are stored in a third data memory.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 5 shows the subunits in the processing unit of the microscope for a preferred embodiment.

DETAILED DESCRIPTION

Figure 1:
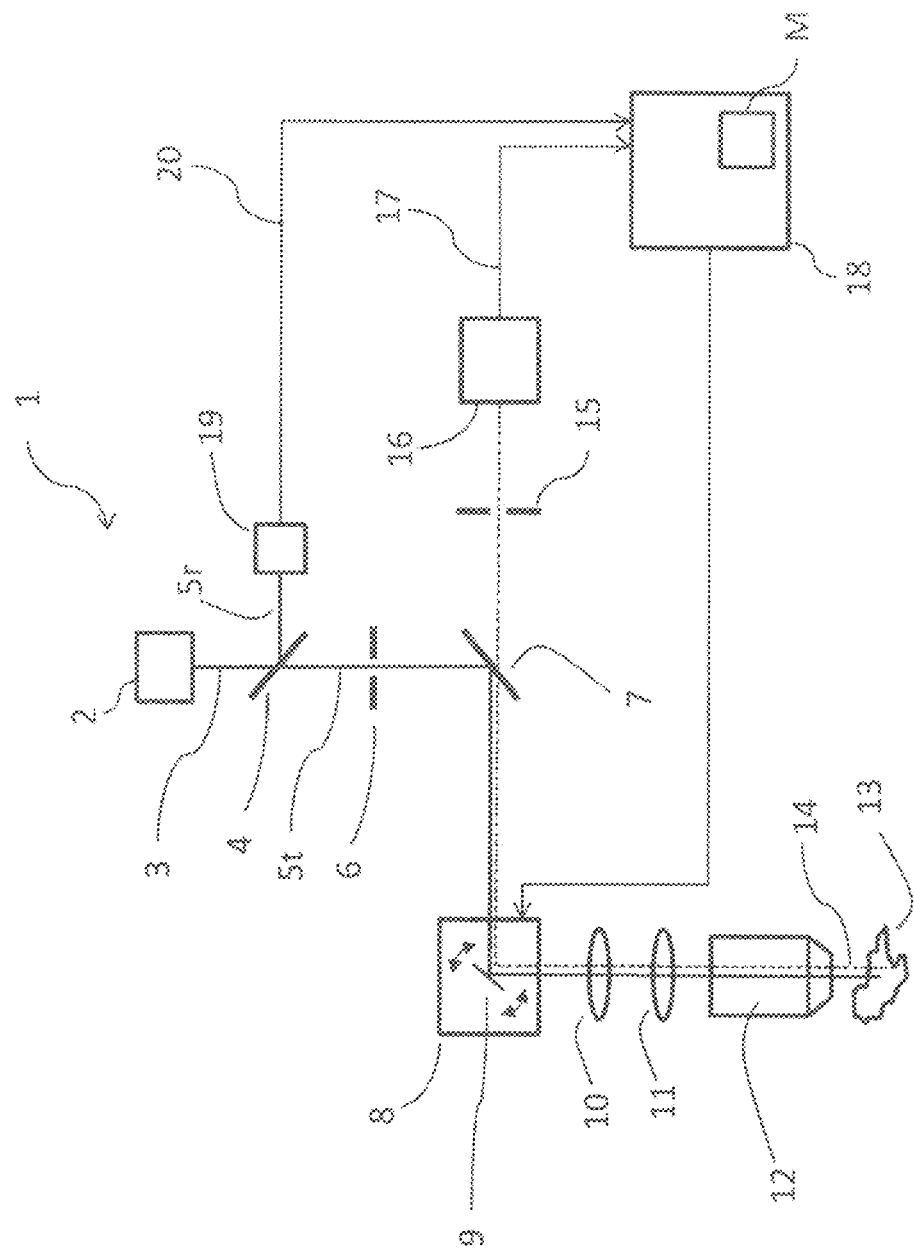
FIG. 1 shows a confocal scanning microscope, which represents an exemplary embodiment of the microscope according to the invention.

Embodiments of the invention provide a fluorescence lifetime imaging microscopy method and a microscope embodied to carry out such a method, which allow an increase in the excitation light intensity while avoiding a pile-up effect with comparatively little technical outlay and which are suitable for universal use of detector types and types of electronics. Another or a same one of the embodiments of the invention provides a method that facilitates a representation of the overall histogram in corrected form.

An embodiment of the invention provides for a fluorescence-lifetime imaging microscopy method with time-correlated single-photon counting, in which excitation light pulses of a pulsed light source are used to periodically excite a sample to emit fluorescence photons, with a measurement interval being defined between two successive excitation light pulses in each case, a detector is used to capture the fluorescence photons and generate a detector signal that represents the captured fluorescence photons, detection times at which the fluorescence photons are detected by the detector within the respective measurement intervals are determined on the basis of the detector signal, and imaging is performed on the basis of the detection times of the captured fluorescence photons.

According to an embodiment of the invention, there is a determination within the respective measurement interval as to whether a predetermined number of fluorescence photons have been captured within the measurement interval.

For a plurality of image pixels, the detection times of all captured photons are compiled in a first data memory (or data region).

For the same plurality of image pixels, the detection times of only those photons from measurement intervals with the predetermined number of captured photons are compiled in a second data memory.

The information from the two data memories are combined in a calculation step and, in turn, stored in a data memory.

The data in the data memory mentioned last can be displayed on an output device or can be used to determine lifetimes of the components of the molecules within the plurality of image pixels.

The measurement interval, which is defined between two successive excitation light pulses in each case, is not necessarily the same as the time interval between these two pulses. Thus, it is also conceivable to let the measurement interval start and end a short time before or after the first of the two aforementioned excitation light pulses. By way of example, typical values of the time before and/or after the first of the two aforementioned excitation light pulses are 1% to 10% of the mean pulse duration of the excitation light or of the time interval between two respectively successive excitation light pulses.

By way of example, the number of detected photons in a measurement interval can be determined by means of a counter which is reset (e.g., set to zero) when a excitation light pulse is identified and which is incremented with each detected photon. The ascertained detection times can be supplemented with information specifying the numerical rank of the respective photon within the measurement interval. Alternatively, an additional data word can be inserted into the data information stream when an excitation light pulse is identified. The corresponding operations for generating the information as to whether the predetermined number of photons has been captured in the measurement interval can be implemented in a logic circuit, in a freely programmable logic unit or in software.

In a particularly simple embodiment, the predetermined number of captured photons equals one.

The detection electronics of the system generates a data stream, with a data word with the detection time being inserted into the data stream for each identified photon. A flag bit is provided in the data word. By way of example, this bit receives a value of 1 if this relates to the first photon detected after the excitation light pulse; otherwise it receives the value of 0. The data stream is processed in a logic circuit, in a freely programmable logic unit or in software. Precisely when two successive data words are flagged, exactly one (1) photon was detected in the measurement interval from which the first data word originates.

According to an embodiment of the invention, the detection times of all captured photons for a plurality of image pixels are compiled in a first data memory and the detection times of the photons from measurement intervals with the predetermined number of captured photons for the same plurality of image pixels are compiled in a second data memory and the information from the two data memories are combined using a calculation step. This plurality of image pixels can be all pixels of an image in this case, or else of pixels in an image region. Conventional image formats have pixels arranged in two dimensions, in rectangular fashion as a rule, wherein, e.g., 1024×1024 or 512×512 pixels are respectively provided in the x- and y-direction. Individual image regions (so-called regions of interest, ROIs) can have a rectangular, square or round region or a two-dimensional form that is freely definable by a user.

In a preferred embodiment, the detection times are compiled by virtue of the frequency of detected photons for a detection time range being ascertained in the form of a histogram. Here, the histogram in the first data memory is the non-corrected overall histogram. Then, the histogram in the second data memory represents a subset of the non-corrected overall histogram in the first data memory. However, the detection times could also be compiled differently, e.g., by determining moments for the frequency of the detected photons as a function of the detection time.

According to an embodiment of the invention, the information in the two data memories is combined using a calculation step. The non-corrected overall histogram, referred to as $M_a(t)$ below, is determined in a preferred embodiment. Additionally, the aforementioned subset is determined as histogram $M_1(t)$ with the number of photons from the measurement intervals in which only a single photon was detected. The histogram columns correspond to the respective detection time following the excitation light pulse. The intention is to ascertain the histogram $f(t)$ that would be recorded in the case of a recording using an ideal device without a dead time.

A photon can only be detected at the time t if no photon was detected within the dead time before the time t. Therefore, the following applies to a column in the overall histogram $M_a(t)$ with the detection time t:

$$M_a(t)=P_0(t-t_d,t) \cdot f(t) \quad (1)$$

where $t_d$ is the dead time of the system. $P_0(a,b)$ is the probability of no photon being detected in the time interval a to b. A similar relationship applies to $M_1$ at the time $t-t_d$:

$$M_1(t-t_d)=P_0(t_0,t-t_d) \cdot P_0(t,t_m) \cdot f(t-t_d) \quad (2)$$

It is only possible to detect exactly one photon at the time $t-t_d$ if no photon was detected beforehand or after the dead time.

Multiplying equations (1) and (2) yields:

$$M_a(t) \cdot M_1(t-t_d)=P_0(t_0,t-t_d) \cdot P_0(t-t_d,t) \cdot P_0(t,t_m) \cdot f(t) \cdot f(t-t_d) \quad (3)$$

Using:

$$P_0=P_0(t_0,t-t_d) \cdot P_0(t-t_d,t) \cdot P_0(t,t_m) \quad (4)$$

equation (3) can be simplified to read:

$$M_a(t) \cdot M_1(t-t_d)=P_0 \cdot f(t) \cdot f(t-t_d) \quad (5).$$

Here, $P_0$ is the probability of not detecting a photon throughout the entire measurement interval. $P_0$ can be determined approximately from the total number of detected photons $M_a$ and the total number of measurement intervals L with the aid of the Poisson distribution function:

$$P_0 \sim e^{-M_a/L} \quad (6)$$

A precise determination is possible if the number of measurement intervals $L_0$ in which no photon was detected is additionally determined during the recording:

$$P_0 = \frac{L_0}{L}. \quad (7)$$

This determination is precise since dead time effects in the measurement intervals without detected photon are negligible, in contrast to measurement intervals with detected photons.

The sought-after values $f(t)$ of the corrected histogram are now determined using a nonlinear optimization method. In a particularly simple embodiment, the method of least-squares approximation is carried out, which minimizes:

$$\sum_{t=t_0+t_d}^{t_m} \left\{ \frac{M_a(t) \cdot M_1(t-t_d)}{P_0} - f(t) \cdot f(t-t_d) \right\}^2 \quad (8)$$

A description of a nonlinear optimization method with least-squares approximation is contained in D. W. Marquardt, "An algorithm for least-squares estimation of non-linear parameters," J. Soc. Indust. Appl. Math., (1963). 11(2) 431-441. It is self-evident to a person skilled in the art that further optimization methods could also be used here, which likewise do justice to the statistical nature of the data.

However, the combination of information from the two data memories using a calculation step need not necessarily be performed using an optimization method. By way of example, it could also be implemented with an iterative refinement of the histogram with successive calculation steps:

$$f''(t-t_d) = \frac{M_a(t) \cdot M_1(t-t_d)}{P_0 \cdot f'(t)} \quad (9)$$

and the initial values:

$$f'(t)=M_1(t) \quad (10)$$

By way of example, the corrected overall histogram can be presented to the user on a computer monitor.

Since the corrected overall histogram has comparable properties to a histogram at a lower excitation light intensity, it is possible to determine fluorescence lifetimes.

A confocal scanning microscope 1, shown in FIG. 1, comprises a pulsed laser light source 2, which is embodied to emit light with periodic excitation light pulses. The excitation light denoted by 3 in FIG. 1 is incident on a beam splitter 4, which splits the excitation light 3 into a transmitted component 5t and a reflected component 5r.

The excitation light 5t transmitted through the beam splitter 4 passes through an excitation pinhole 6 and is then reflected at a dichroic beam splitter 7 in the direction of a scanning unit 8. The scanning unit 8 contains a gimbal-mounted scanning mirror 9, which reflects the excitation light 5t in the direction of a scanning lens 10. Following the passage through the scanning lens 10 and a tube lens 11, the excitation light 5t reaches a microscope objective 12, which guides the excitation light 5t onto a sample 13.

Fluorescent molecules are excited to emit fluorescence light 14 in the region of the sample 13 illuminated by the excitation light 5t. The fluorescence photons forming the fluorescence light 14 propagate along the light path, used by the excitation light 5t to reach the sample 13 from the dichroic beam splitter 7, in the reverse direction back to the beam splitter 7. After passing through the beam splitter 7 and a detection pinhole 15, the fluorescence light 14 then reaches a first detector 16. The first detector 16 converts the received fluorescence light 14 into a detector signal 17, the latter being fed to a processing unit 18 comprising a monitor M.

In addition to the first detector 16, which converts the received fluorescence light 14 into the detector signal, the scanning microscope 1 comprises a second detector 19, which is arranged in the beam path split off by the beam splitter 4. Consequently, the second detector 19 receives the component 5r of the excitation light 3 emitted by the laser light source 2 that has been reflected by the beam splitter 7. The second detector 19 converts the excitation light 5r reflected at the beam splitter 4 into an excitation signal 20 and feeds the latter to the processing unit 18.

In order to avoid the pile-up effect, as explained at the outset, the processing unit 18 is embodied according to the invention to determine, on the basis of the detector signal, whether a predetermined number of photons were identified within a measurement interval defined, e.g., by two successive excitation light pulses, to compile the detection times of all captured photons in a data memory, to compile the detection times of only those photons from measurement intervals with the predetermined number of captured photons in a second common data memory, to combine the information in the two data memories using a calculation step, and to store the results of this calculation step in a data memory.

The processing unit 18 is further embodied to drive the scanning unit 9 in a manner known per se. Moreover, the processing unit 18 comprises a display device M, e.g., a monitor.

Figure 2:
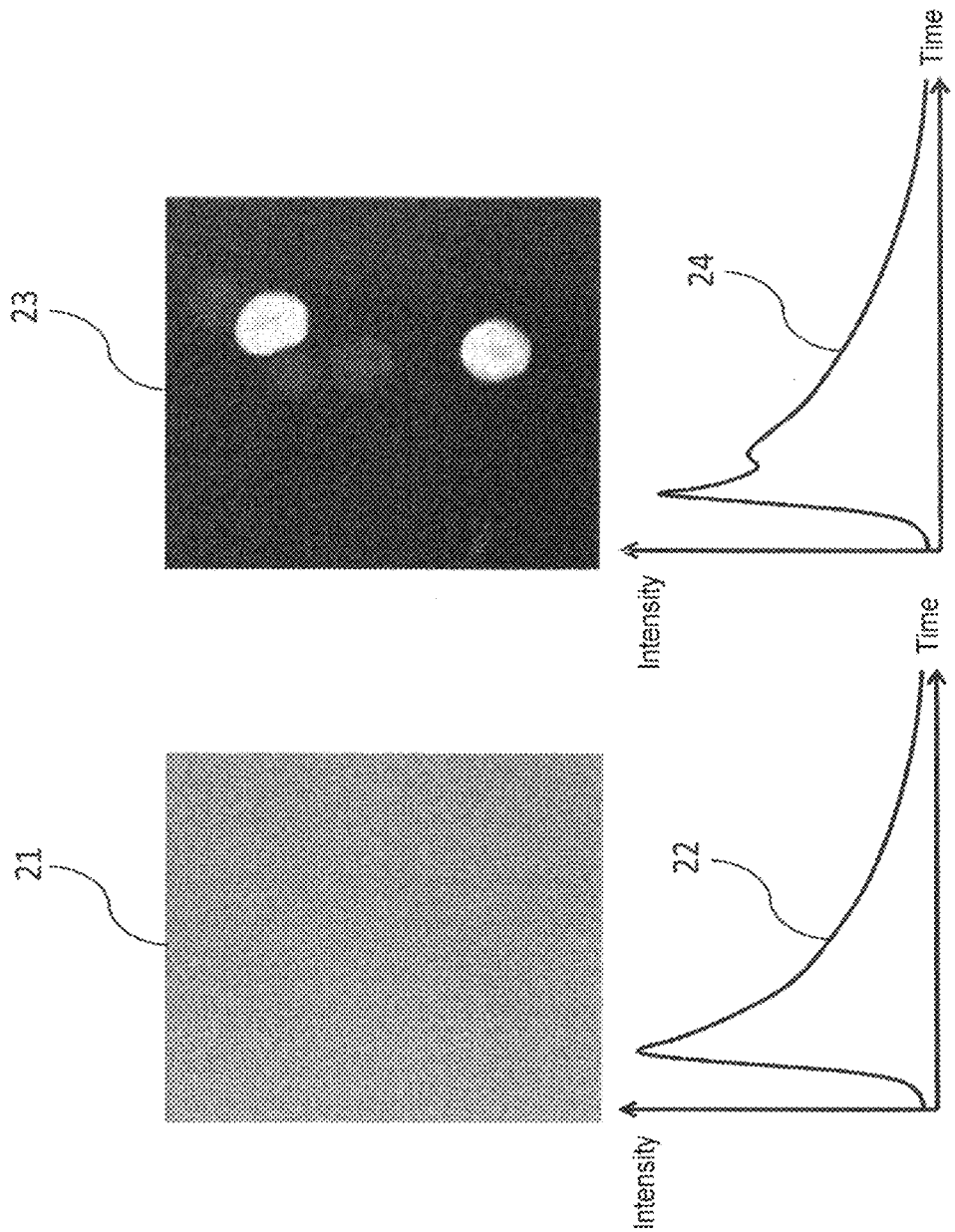
FIG. 2 shows the non-corrected overall histograms of a homogeneous sample and a non-homogeneous sample, for the purposes of elucidating the problem.

FIG. 2 elucidates the problem solved by the calculation step for combining the information from the two memories. It shows the non-corrected overall histogram 22 from a recording of a homogeneous sample 21 and the non-corrected overall histogram 24 from a recording of an inhomogeneous sample 23, with the entire excitation light intensity, i.e., the total number of recorded photons, being approximately the same in both cases; however, clear intensity maxima are present locally in the image of the inhomogeneous sample 23. From the different form of the overall histograms according to FIG. 2, it is evident that the information in an overall histogram alone is not sufficient to be able to undertake a robust correction. Many methods according to the prior art cannot be applied to an overall histogram because the dead time effects depend on the concentrations of the different components at different locations. In the example according to FIG. 2, it is possible, in particular, to identify that no pile-up effect occurs in the recording of the homogeneous sample 21 since the excitation light intensity in each individual image pixel is (constantly) relatively low in this case. By contrast, a pile-up effect can be seen in the recording of the inhomogeneous sample 23 since this includes image regions whose pixels receive a comparatively high excitation light intensity and the component of the photons striking the detector within the dead time after the last detected photon increases with the excitation light intensity.

Figure 3:
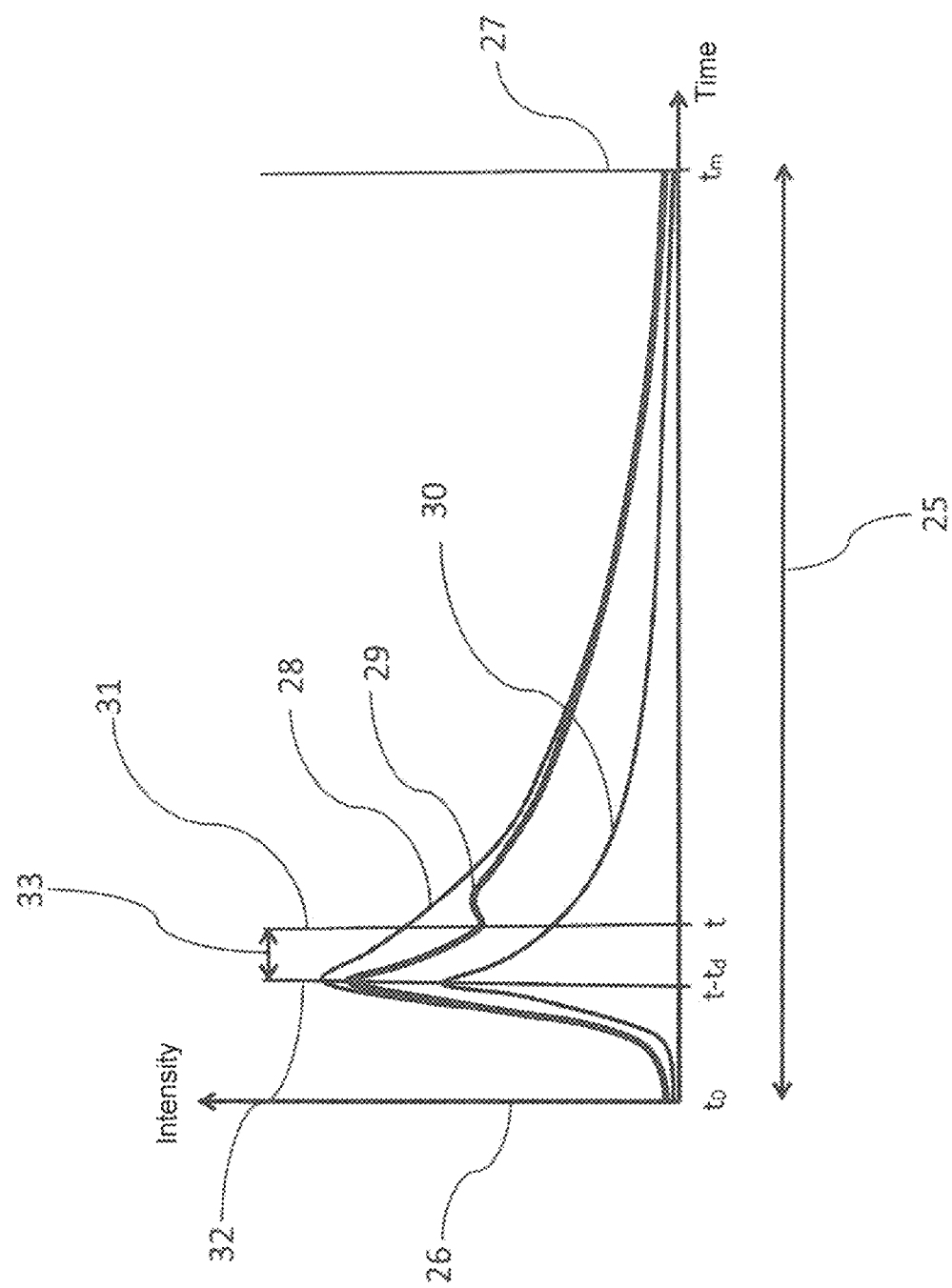
FIG. 3 shows overall histograms with the associated dead time effects for all photons, for the photons from the measurement intervals in which only a single photon was detected, and a corrected overall histogram.

FIG. 3 illustrates a measurement interval 25 with a measurement interval start 26 and a measurement interval end 27, a typical ideal overall histogram $f(t)$ (reference sign 28), to be determined according to the invention, and a non-corrected overall histogram $M_a(t)$ (reference sign 29) with a very high excitation light intensity.

A further histogram $M_1(t)$ (reference sign 30) only contains the data of photons from those measurement intervals in which only a single photon was detected. A reduction of intensity in $M_a(t)$ (reference sign 29) as a result of the dead time effects with the dead time $t_d$ (reference sign 33) at a time t (reference sign 31) is always linked to an increase of intensity in $M_1(t)$ (reference sign 30) at the time $t-t_d$ (reference sign 32).

The corrected overall histogram $f(t)$ can be ascertained from the variables $M_a(t)$ and $M_1(t)$, for example by applying the relationships (1) to (8) specified further above or the relationships (9) and (10).

Figure 4:
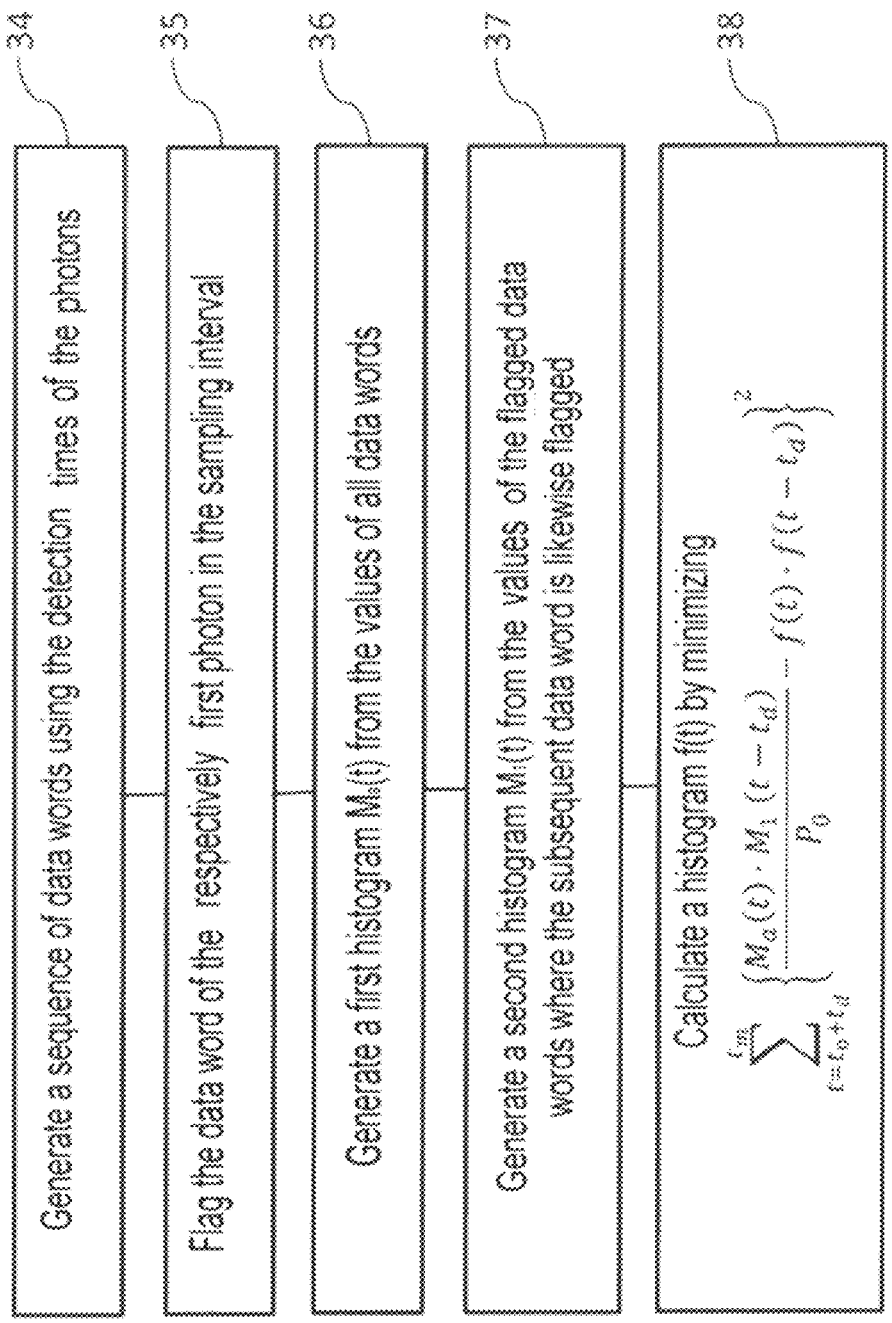
FIG. 4 shows the sequence of the individual processing steps in a preferred embodiment of the method.

FIG. 4 illustrates a sequence of operations that can be carried out by the processing unit 18. Initially, a detection time for each identified photon is determined from the detector signals 17 and 20 by means of a time measurement between the signal of the photon 17 and the signal 20 of the excitation light pulse the detection time (not illustrated as a dedicated method step in FIG. 4). In a step 34, a sequence of data words is generated using the detection times of the photons, the data words being arranged in the sequence of incidence of the associated photon. In subsequent step 35, the data words in which no other photon was identified in the measurement interval before the associated photon are flagged. In step 36, the non-corrected overall histogram $M_a(t)$ then is generated from all data words. The overall histogram is stored in a first data memory. Subsequently, the histogram $M_1(t)$ is generated in step 37 from all the flagged data words whose subsequent data word is likewise flagged. This histogram $M_1(t)$ is stored in a second data memory. In step 38, the corrected overall histogram $f(t)$ is calculated from the histograms $M_a(t)$ and $M_1(t)$ in the two data memories, wherein a nonlinear optimization method minimizes the expression (8) already derived further above:

$$\sum_{t=t_0+t_d}^{t_m} \left\{ \frac{M_a(t) \cdot M_1(t-t_d)}{P_0} - f(t) \cdot f(t-t_d) \right\}^2$$

In so doing, the corrected overall histogram $f(t)$ is stored in a further data memory. The data from the memory specified last are presented on a monitor and used to determine fluorescence lifetimes.

FIG. 5 illustrates constituent parts of the processing unit 18 of the microscope 1, which the method according to the invention use. In a time measurement unit 39, a data stream of data words with the detection times of the identified photons is generated from the detector signal 17 and the excitation signal 20. A flagging unit 40 flags data words whose associated photon has been captured as first photon in the sampling interval. In a first histogram generating unit 41, the non-corrected overall histogram $M_a(t)$ is calculated and stored in a first memory. The histogram $M_1(t)$ is generated in a second histogram generating unit 42 from the flagged data words whose subsequent data word is likewise flagged. The histogram $M_1(t)$ is stored in a second memory by the histogram generating unit 42. The data from the two memories are linked in a calculation unit 43, as a result of which the corrected overall histogram $f(t)$ arises, the latter being stored in a result data memory 44. The data from the result data memory 44 are presented on a monitor and used to determine fluorescence lifetimes.

The aforementioned memories, in which the histograms $M_a(t)$, $M_1(t)$ and $f(t)$ are stored, are embodied, for example, as separate memory areas of a memory and which is part of the processing unit 18. However, such an embodiment should be understood as being purely exemplary. All that needs to be ensured is that the aforementioned histograms are kept available, in any way per se, in order to be processed as described above.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A fluorescence-lifetime imaging microscopy method with time-correlated single-photon counting, the method comprising:
    using excitation light pulses of a pulsed light source to periodically excite a sample to emit fluorescence photons, with a measurement interval being defined between two successive excitation light pulses in each case,
    capturing, using a detector, the fluorescence photons, and generating a detector signal that represents the captured fluorescence photons,
    determining detection times at which the fluorescence photons are detected by the detector within the respective measurement intervals based on the detector signal,
    performing a calculation step, and
    performing imaging based on the detection times,
    wherein there is a determination within the respective measurement intervals as to whether a predetermined number of fluorescence photons have been captured within the respective measurement interval,
    wherein the detection times of all captured fluorescence photons are compiled in a first data memory, common to a plurality of image pixels,
    wherein the detection times of only those fluorescence photons which were captured in the predetermined number within the respective measurement intervals are compiled in a second data memory, common to the same plurality of image pixels,
    wherein the detection times compiled in the first data memory are combined with the detection times compiled in the second data memory within the calculation step, and
    wherein results of the calculation step are stored in a third data memory.

2. The fluorescence-lifetime imaging microscopy method as claimed in claim 1, wherein:
    the detection times compiled in the first data memory are ascertained in the form of a first histogram, which represents a non-corrected overall histogram,
    the detection times compiled in the second data memory are ascertained in the form of a second histogram, which represents a subset of the first histogram, and
    the results of the calculation step stored in the third data memory are ascertained in the form of a third histogram, which represents a corrected overall histogram.

3. The fluorescence-lifetime imaging microscopy method as claimed in claim 2, wherein the corrected overall histogram represents an ideal histogram, which would have been recorded without dead time.

4. The fluorescence-lifetime imaging microscopy method as claimed in claim 2, wherein columns of the first histogram are combined with columns of the second histogram, which are assigned to different detection times than the columns of the first histogram, within the calculation step.

5. The fluorescence-lifetime imaging microscopy method as claimed in claim 2, wherein an iterative refinement of the third histogram is undertaken within the calculation step.

6. The fluorescence-lifetime imaging microscopy method as claimed in claim 5, wherein the iterative refinement is implemented using the relationship:

$$f''(t - t_d) = \frac{M_a(t) \cdot M_1(t - t_d)}{P_0 \cdot f'(t)}.$$

7. The fluorescence-lifetime imaging microscopy method as claimed in claim 1, wherein the predetermined number equals 1.

8. The fluorescence-lifetime imaging microscopy method as claimed in claim 1, wherein the detector signal is generated in the form of a data stream, in which a data word is inserted for each captured fluorescence photon.

9. The fluorescence-lifetime imaging microscopy method as claimed in claim 8, wherein a flag bit is provided in the data word, the flag bit specifying whether the respective fluorescence photon is part of the predetermined number of fluorescence photons which have been captured in the respective measurement interval.

10. The fluorescence-lifetime imaging microscopy method as claimed in claim 1, wherein a nonlinear optimization is performed within the calculation step.

11. The fluorescence-lifetime imaging microscopy method as claimed in claim 10, wherein the relationship:

$$M_a(t) \cdot M_1(t - t_d) = P_0 \cdot f'(t) \cdot f(t - t_d)$$

is used to perform the nonlinear optimization.

12. The fluorescence-lifetime imaging microscopy method as claimed in claim 1, wherein the results of the calculation step are visualized on an output device.

13. The fluorescence-lifetime imaging microscopy method as claimed in claim 1, wherein the results of the calculation step are used to determine fluorescence lifetimes.

14. A microscope for carrying out a fluorescence-lifetime imaging microscopy method with time-correlated single-photon counting, the microscope comprising:
    a light source configured to excite a sample with excitation light pulses to emit fluorescence photons, with a measurement interval being defined between two successive excitation light pulses in each case,
    a detector configured to capture the fluorescence photons and generate a detector signal representing the captured fluorescence photons, and
    a processor configured to:
        determine detection times at which the fluorescence photons are detected by the detector within the respective measurement intervals based on the detector signal and to perform imaging based on the detection times, determine within the respective measurement intervals whether a predetermined number of fluorescence photons have been captured within the respective measurement interval, compile the detection times of all captured fluorescence photons in a first data memory, common to a plurality of image pixels, compile the detection times of only those fluorescence photons which were captured in the predetermined number within the respective measurement intervals in a second data memory, common to the same plurality of image pixels, perform a calculation step in which the detection times compiled in the first data memory are combined with the detection times compiled in the second data memory, and store results of the calculation step in a third data memory.

15. The microscope as claimed in claim 14, wherein the microscope is a confocal scanning microscope or a multiphoton microscope.

* * * * *